United States Patent [19]
Yamashita

[11] Patent Number: 5,903,836
[45] Date of Patent: May 11, 1999

[54] SATELLITE COMMUNICATION CHARGING SYSTEM

[75] Inventor: Hiroshi Yamashita, Tokyo, Japan

[73] Assignee: NEC Corporation, Japan

[21] Appl. No.: 08/888,186

[22] Filed: Jul. 3, 1997

Related U.S. Application Data

[63] Continuation of application No. 08/579,056, Dec. 21, 1995, abandoned, which is a continuation of application No. 08/202,815, Feb. 28, 1994, abandoned.

[30] Foreign Application Priority Data

Mar. 1, 1993 [JP] Japan .................................. 5-040101

[51] Int. Cl.⁶ .................................................. H04Q 7/20
[52] U.S. Cl. .......................... 455/427; 455/406; 379/114
[58] Field of Search ..................................... 455/406, 407, 455/408, 422, 427, 12.1, 550, 552; 379/111, 114, 130, 131, 132, 144, 154

[56] References Cited

U.S. PATENT DOCUMENTS

| | | | |
|---|---|---|---|
| 4,640,986 | 2/1987 | Yotsutani et al. | 379/63 X |
| 4,776,000 | 10/1988 | Parienti | 379/91 |
| 5,109,401 | 4/1992 | Hattori et al. | 379/58 |
| 5,303,297 | 4/1994 | Hillis | 379/63 |

FOREIGN PATENT DOCUMENTS

| | | |
|---|---|---|
| 62-90040 | 4/1987 | Japan . |
| 3-175825 | 7/1991 | Japan . |

*Primary Examiner*—Dwayne D. Bost
*Assistant Examiner*—William G. Trost
*Attorney, Agent, or Firm*—Ostrolenk, Faber, Gerb & Soffen, LLP

[57] ABSTRACT

A satellite communication charging system is arranged between a parent station apparatus and child stations installed in a plurality of areas. A plurality of pay phone sets are respectively connected to the child stations. The parent station apparatus includes a charging data memory and a parent station control section. Each child station includes a child station control section. The parent station control section includes a unit for specifying a terminating child station from an address number included in a call connection request from an originating child station, obtaining corresponding charging data, and transmitting the charging data and control data to the originating child station and the terminating child station. The child station control section includes a section for storing the charging data from the parent control section, and a section for performing charging on the basis of the stored charging data.

6 Claims, 3 Drawing Sheets

SATELLITE COMMUNICATION CHARGING SYSTEM

This is a Continuation of application Ser. No. 08/579,056, filed on Dec. 21, 1995, now abandoned which is a Continuation of application Ser. No. 08/202,815, filed on Feb. 28, 1994, now abandoned.

BACKGROUND OF THE INVENTION

1. Field of the Invention

The present invention relates to a charging system for a satellite communication system of a demand assignment multiple access scheme and, more particularly, to a charging system for an SCPC (Single Channel Per Carrier) communication apparatus for transmitting speech and data by using subscriber terminal units in a satellite communication system of the demand assignment multiple access scheme.

2. Description of the Relevant Art

FIG. 1 is a block diagram showing a conventional satellite communication charging system.

Conventionally, in satellite communication, an SCPC communication scheme has been used, in which one narrowband carrier is assigned to one speech channel. In addition, satellite communication has been performed by the demand assignment multiple access scheme (to be referred to as the DAMA scheme hereinafter) to effectively use carriers. Referring to FIG. 3, a call connection between two terminals (subsidiary stations 2A and 3A) to be connected by this scheme is performed by one satellite link. That is, while a call connection is maintained, speech channel frequencies (f1v and f2v) are separated from control channel frequencies (f1c and f2c) which are assigned to and used by a parent station apparatus 1A to monitor and control call connections with respect to the whole network. Therefore, the two subsidiary stations 2A and 3A are released from monitoring and control of the parent station apparatus 1A so as to be isolated therefrom.

Assume that a terminal to which a call connection is performed is a device, such as a pay phone set, which requires charging. In this case, charging with respect to the call connection must be performed by the pay phone set by itself because communication between the subsidiary stations is isolated from the parent station, as describe above.

As described above, in a conventional satellite communication charging system, charging must be performed by a pay phone set by itself. For this reason, a ROM (Read Only Memory) in which charging data is stored is incorporated in each pay phone set. In charging, a pay phone set on the originating side discriminates area data on the terminating side on the basis of its telephone number, and coins are received in accordance with a unit time written in the ROM.

The following two problems to be solved, however, are posed in such a conventional satellite charging system.

First, protection against overcharges needs to be enhanced. More specifically, in the conventional scheme, no satellite link quality check result is reflected in charging with respect to the pay phone set on an originating side. Even if, therefore, an abnormality occurs in the satellite link, for some reason, to result in a speech communication failure, charging is continued unless the caller performs an ON-hook operation. This may cause an overcharge.

Second, when the manager of the network tries to change the rate system, the ROM in each pay phone set must be replaced. In general, owing to the communication network based on satellite communication, subsidiary stations to which terminal devices such as pay phone sets are connected tend to be located in a wide range of areas Therefore, difficulty is expected in replacing ROMs. As the network increases in size, it becomes more difficult to change the rate system.

SUMMARY OF THE INVENTION

The present invention has been made to solve the above problems, and has as its object to provide a satellite communication charging system which prevents overcharges which may be caused by an abnormal call termination and the like in a satellite link, and can easily change a rate system after it has been put in practice.

In order to achieve the above object, according to a main aspect of the present invention, a satellite communication charging system comprising a parent station apparatus including a parent station control section for managing frequencies by using a demand assignment multiple access scheme for frequency control of a satellite link, and a plurality of subsidiary stations, to which pay phone sets requiring charging are respectively connected, and which respectively include subsidiary station control sections for performing call connection processing under the control of the parent station apparatus, the parent station apparatus including a charging data memory for storing charging data corresponding to area data in advance, and means for specifying an area where a terminating subsidiary station is installed, from an address number included in a call connection request transmitted from an originating subsidiary station, obtaining corresponding charging data on the basis of the area data and contents of the charging data memory, and transmitting the charging data to the originating subsidiary station and the terminating subsidiary station together with control data, and the subsidiary station control section including storage means for receiving and storing the charging data transmitted from the parent station control section, and means for performing charging on the basis of the charging data stored in the storage means.

According to another aspect of the present invention, in the main aspect described above, the subsidiary station control sections collate the charging data, transmitted from the parent station apparatus, with each other in the process of performing bidirectional call connection processing, and finish the call connection processing to set a busy state on the basis of a collation result.

According to still another aspect of the present invention, in the main aspect, the subsidiary station includes a call time measuring section for measuring a call time, and the subsidiary station control section includes means for performing a link check with respect to an originating pay phone set for each unit call time measured by the call time measuring section on the basis of the stored charging data when a busy state is set, and transmitting a charging signal to the pay phone set upon confirming that the satellite link is properly connected.

According to the above-described aspects, the satellite communication charging system of the present invention has the following advantages.

First, a rate system can be easily changed after it has been put into practice for the following reason. In call connection processing, charging data is transmitted from the parent station apparatus to an originating child station and a terminating subsidiary station, together with control data, and charging is performed on the basis of this charging data. Second, charging data can be checked because call connection processing is finished to set a busy state when charging data are collated with each other in the originating and terminating stations, and the collation result indicates a coincidence. Third, overcharges which may be caused by an abnormality and the like in the satellite link can be prevented by the following operation. When a busy state is set, a link check is performed during speech communication in the originating pay phone set for each unit call time on the basis of charging data. A charging signal is then transmitted to the pay phone set upon confirming that the link is properly connected.

The above and many other advantages, features and additional objects of the present invention will become manifest to those versed in the art upon making reference to the following detailed description and accompanying drawings in which preferred structural embodiments incorporating the principles of the present invention are shown by way of illustrative example.

DETAILED DESCRIPTION OF THE PREFERRED EMBODIMENT

A preferred embodiment of the present invention will be described in detail below with reference to the accompanying drawings.

Figure 1:
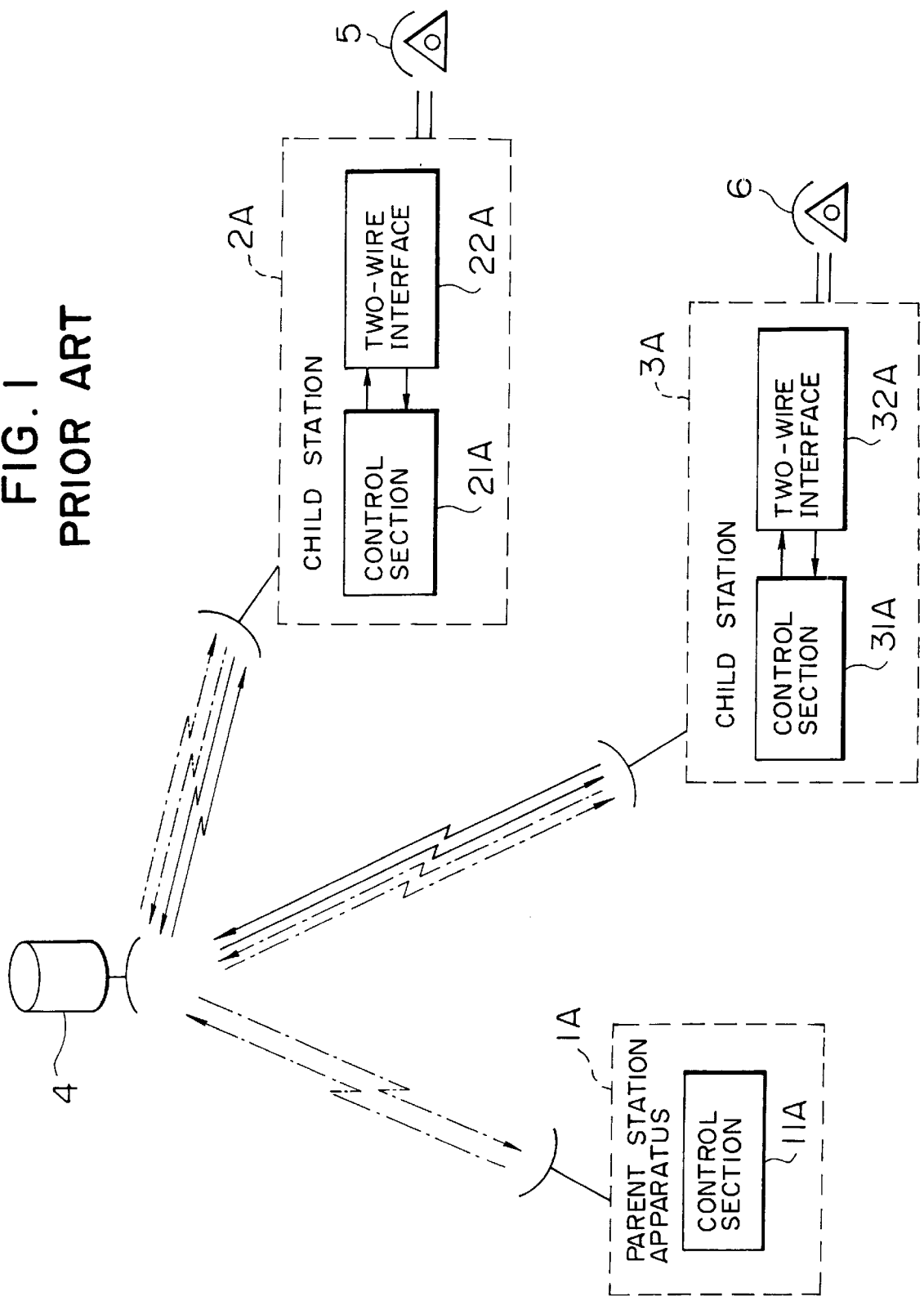
FIG. 1 is a block diagram for explaining a conventional satellite communication charging system.
Figure 2:
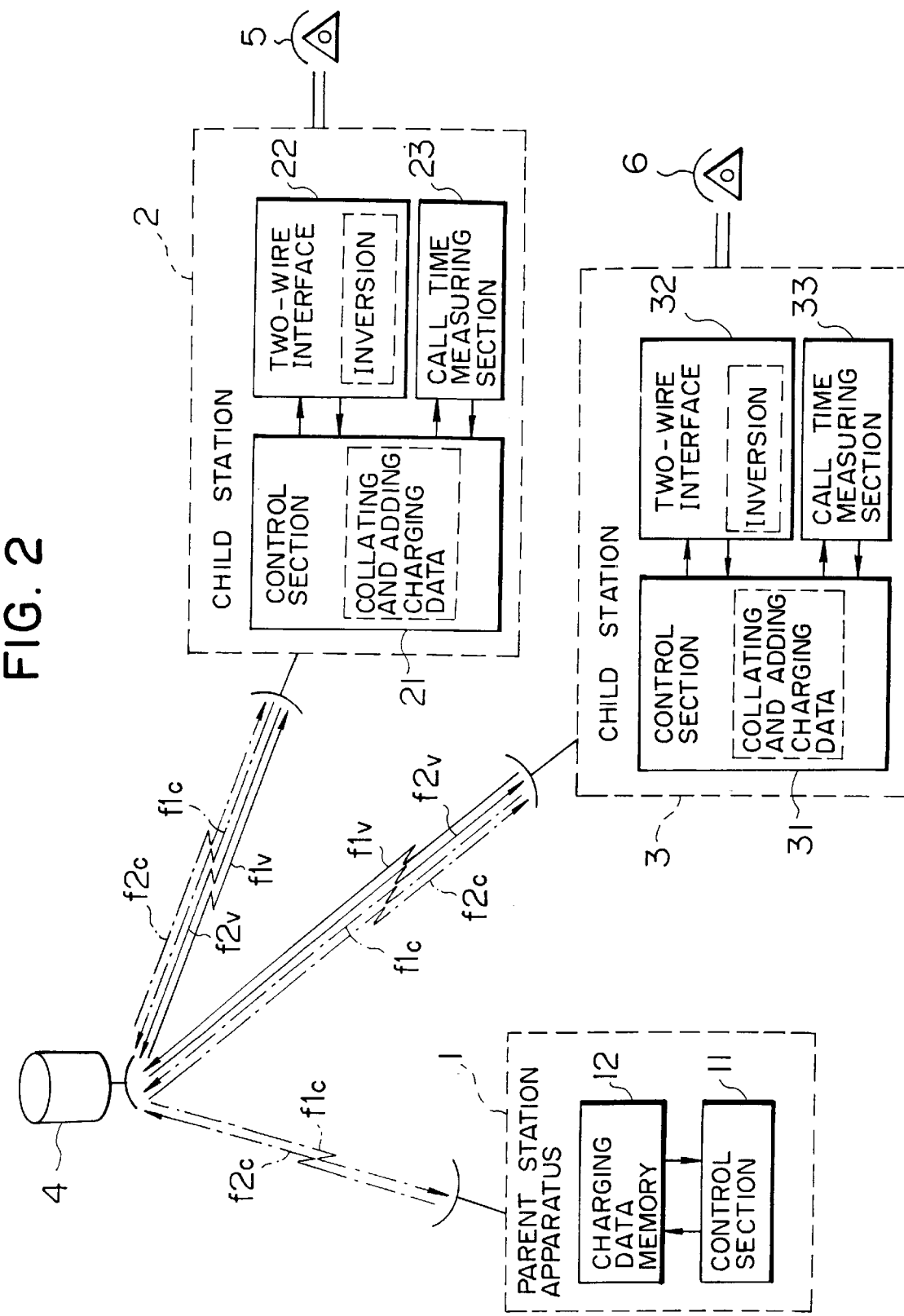
FIG. 2 is a block diagram for explaining a satellite communication charging system according to an embodiment of the present invention.

FIG. 2 shows the arrangement of a satellite communication charging system according to an embodiment of the present invention. Referring to FIG. 1, the satellite communication charging system includes parent apparatus 1 and subsidiary stations 2 and 3 located in different geographic areas. The parent apparatus 1 includes a control section 11 serving as a parent station control section for managing frequencies by using a demand assignment multiple access scheme for frequency control between a satellite 4 and a satellite link. The child stations 2 and 3 respectively include control sections 21 and 31 serving as subsidiary station control sections to which pay phone sets 5 and 6, each requiring a charging operation, are connected, and which respectively perform call connection processing under the control of the parent apparatus 1.

The present invention is characterized as follows. The parent apparatus 1 includes a charging data memory 12 for storing charging data corresponding to area data in advance.

The control section 11 includes a means for specifying an area where a terminating subsidiary station (the subsidiary station 3 in this case) is installed, from an address number included in a call connection request transmitted from an originating subsidiary station (the subsidiary station 2 in this case) through a control channel frequency f1c, obtaining the corresponding charging data on the basis of the area data and the contents of the charging data memory 12, and transmitting the charging data to the originating subsidiary station 2 and the terminating subsidiary station 3, together with control data, through a control channel frequency f2c.

The control section 21 includes a means for receiving and storing the charging data transmitted from the control section 11, and a means for charging on the basis of the charging data stored in the former means.

The control sections 21 and 31 also include means for collating the charging data transmitted from the parent apparatus 1 in the process of performing bidirectional call connection processing through speech channel frequencies f1v and f2v, and completing the call connection processing to set a busy state on the basis of the collation result.

The subsidiary station 2 includes a call time measuring section 23 for measuring a call time. The control section 21 includes means for performing a link check with respect to the pay phone set 5 for each unit call time measured by the call time measuring section 23 on the basis of the stored charging data when a busy state is set, and transmitting a charging signal to the pay phone set 5 upon confirmation of proper connection of the satellite link.

Figure 3:
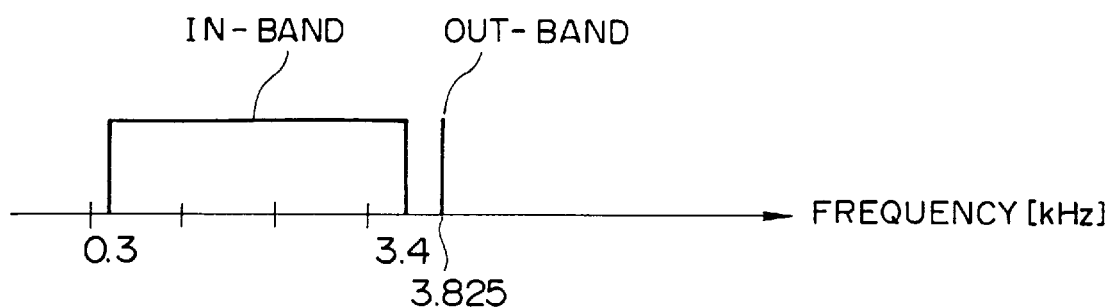
FIG. 3 is a graph showing frequencies used in the satellite communication charging system of the present invention.

The operation of the satellite communication charging system having the above arrangement will be described below. FIG. 3 shows frequencies used in the satellite communication charging system of the present invention. Referring to FIGS. 2 and 3, in link connection processing performed by the conventional DAMA, when an originating station (the subsidiary station 2) generates a call connection request with respect to a terminating station (the child station 3) in FIG. 2, the subsidiary station 2 transmits this request to the parent apparatus 1 through the control channel frequency f1c. The parent apparatus 1 selects two speech channel frequencies f1v and f2v from pooled free frequencies, and controls the subsidiary stations 2 and 3 through the other control channel frequency f2c to change their transmission and reception frequencies to the frequencies f1v and f2v.

First of all, the present invention additionally has a function of adding charging data to control data which is transmitted when speech channel frequencies are assigned to the subsidiary stations 2 and 3 by the parent apparatus 1 through the control channel frequency f2c, and transmitting the resultant data to the subsidiary stations 2 and 3. That is, the parent apparatus 1 additionally has a function of specifying the areas of the subsidiary stations 2 and 3 from the call connection request and the dial number of the subsidiary station 3 which are received from the subsidiary station 2 through the control channel frequency f1c, and transmitting data obtained by referring to the predetermined charging data as control data, to the two subsidiary stations 2 and 3.

The two subsidiary stations 2 and 3, whose transmission and reception frequencies have been shifted to the speech channel frequencies under the control of the parent apparatus 1, become incapable of communicating with the parent apparatus 1 through the control channel frequencies f1c and f2c. That is, the two subsidiary stations 2 and 3 are isolated from monitoring and control of the parent apparatus 1. At this time, bidirectional connection processing for a call connection is performed only between the subsidiary stations 2 and 3. Second, the present invention additionally has a function of adding charging data, received from the parent apparatus 1, to control data used for call connection processing between the subsidiary stations 2 and 3, transmitting the resultant data, collating the charging data received by the two subsidiary stations 2 and 3 through the control sections 21 and 31, and finishing the call connection processing upon confirming a coincidence between the contents.

When the two subsidiary stations 2 and 3 are set in a busy state, data communication is performed between the two subsidiary stations 2 and 3 through the out-band frequency shown in FIG. 3 independently of the speech communication. Third, the present invention additionally has a function of also adding charging data to a data signal for this link check, transmitting a charging signal to a pay phone set by, e.g., a method of inverting the polarities of two lines connected to the pay phone set, upon confirming a proper state of the satellite link every time a unit call time elapses, which time is monitored by the control section 21 of the subsidiary station 2, thereby performing charging.

If it is determined upon collation that the charging data do not coincide with each other, the two child stations 2 and 3 stop the call connection processing, reset the frequencies to the control channel frequencies (f1c and f2c), and request the parent apparatus 1 to transmit charging data and control data through the control channel frequency f1c. In addition, if an abnormality is detected by a link check, the charging is stopped, and the frequencies are changed to the control channel frequencies, "abnormal call termination" is informed to the parent apparatus 1.

What is claimed is:

1. A satellite communication charging system, comprising: a parent station apparatus including a parent station control section for managing frequencies by using a demand assignment multiple access scheme for frequency control of a satellite link, and a plurality of subsidiary stations, to which pay telephone terminals requiring a charging operation are respectively connected, and which respectively include subsidiary station control sections for performing call connection processing under the control of said parent station apparatus, said parent station apparatus including a charging data memory for storing charging data corresponding to geographical data, and means for specifying a geographical location where a terminating subsidiary station is located from an address number included in a call connection request transmitted from an originating subsidiary station, for obtaining corresponding charging data on the basis of the geographical data and contents of said charging data memory, and for transmitting the charging data to said originating subsidiary station and said terminating subsidiary station together with control data, and said subsidiary station control sections including storage means for receiving and storing the charging data transmitted from said parent station control sect ion, and means for charging on the basis of the charging data stored in said storage means, and said subsidiary station control sections collate the charging data transmitted from said parent station apparatus with each other during the process of performing bidirectional call connection processing, and complete the bidirectional call connection processing by setting a busy state on the basis of a confirmed coincidence of the charging data.

2. A system according to claim 1, wherein said subsidiary station includes a call time measuring section for measuring a call time, and said subsidiary station control section includes means for performing a link check with respect to an originating pay phone set for each unit call time measured by said call time measuring section on the basis of the stored charging data when a busy state is set, and transmitting a charging signal to said pay phone set upon confirming that the satellite link is properly connected.

3. A system according to claim 2, wherein the charging signal transmitted to said pay phone is by an out-band of about 3.825 KHz, which is independent of a voice link.

4. A satellite communication charging system, comprising:

a parent station apparatus including a parent station control section for managing frequencies by using a demand assignment multiple access scheme for frequency control of a satellite link, and a plurality of subsidiary stations, to which pay telephone terminals requiring a charging operation are respectively connected, and which respectively include subsidiary station control sections for performing call connection processing under the control of said parent station apparatus, said parent station apparatus including a charging data memory for storing charging data corresponding to geographical data, and a device specifying a geographical location where a terminating subsidiary station is located from an address number included in a call connection request transmitted from an originating subsidiary station, said device obtaining corresponding charging data on the basis of the geographical data and contents of said charging data memory, and said device transmitting the charging data to said originating subsidiary station and said terminating subsidiary station together with control data, and said subsidiary station control sections including a storage unit for receiving and storing the charging data transmitted from said parent station control section, and a charging device charging on the basis of the charging data stored in said storage unit, and said subsidiary station control sections collate the charging data transmitted from said parent station apparatus, with each other during the process of performing bidirectional call connection processing, and complete the bidirectional call connection processing by setting a busy state on the basis of a confirmed coincidence of the charging data.

5. A system according to claim 4, wherein said subsidiary station includes a call time measuring section for measuring a call time, and said subsidiary station control section includes means for performing a link check with respect to an originating pay phone set for each unit call time measured by said call time measuring section on the basis of the stored charging data when a busy state is set, and transmitting a charging signal to said pay phone set upon confirming that the satellite link is properly connected.

6. A system according to claim 5, wherein the charging signal transmitted to said pay phone is by an out-band of about 3.825 KHz, which is independent of a voice link.

\* \* \* \* \*